Patented Nov. 15, 1932

1,887,978

UNITED STATES PATENT OFFICE

HENRY JOSEPH, OF ST. ALBANS, NEW YORK, ASSIGNOR TO GENERAL CHEMICAL COMPANY, OF NEW YORK, N. Y., A CORPORATION OF NEW YORK

CATALYST

No Drawing.　　　Application filed September 23, 1931.　Serial No. 564,719.

This invention relates to catalysts and to the utilization of the same in catalytic conversion reactions. Generally speaking, the invention is directed to the provision of a vanadium catalyst capable of effecting catalytic gas phase reactions and more particularly to a vanadium catalyst suited for use in connection with the production of sulfuric anhydride from gases containing sulfur dioxide and oxygen by the contact process. In the more specific aspects the invention relates to vanadium catalysts having alkalies, such as sodium and potassium, as components thereof.

Vanadium catalysts containing alkalies have heretofore been proposed, as for example in U. S. Patent 1,371,004 granted March 8, 1921 to Slama and Wolf, and it is to catalysts of that general description to which the present invention relates.

The principal object of the invention resides in the provision of a catalyst, particularly adapted for use in the production of sulfur trioxide by the contact process, which effects efficient conversion over a comparatively wide temperature range. A further object of the invention lies in the provision of a vanadium catalyst which makes possible the initiation of the conversion operation at low temperatures. Accordingly, the invention provides a vanadium catalytic material by the use of which efficient conversion over a wider range may be obtained, and by which the important advantage is secured that the conversion temperature range is extended downwardly to a material degree and conversion may thereby be initially effected at comparatively low temperatures.

Although, as noted, vanadium catalysts containing alkalies such as sodium and potassium have been heretofore proposed and employed in the contact process, it has been found that the conversion operation may be improved and the foregoing advantages obtained by adjusting the proportions of alkalies with respect to each other, and also by regulating the total alkali content of the catalyst with respect to the total weight of the catalytic mass. Hence, the invention comprises the provision of vanadium catalysts containing sodium and potassium in such quantities that the ratios of sodium to potassium with respect to each other, and the total alkali contents of the catalysts with respect to the total weight of the catalytic masses are as hereinafter specified.

According to the preferred embodiment of the invention, it has been found that the sought-for advantages thereof may be procured where the vanadium catalyst employed includes sodium and potassium in such quantities that the contained sodium and potassium, calculated as the sulfates of these elements, are present in substantially the ratio of one to three. Further, to obtain the full advantages of the invention, the quantity of alkali incorporated into the catalyst is such that the total alkalies, also calculated as sulfates present in the catalyst before sulfating by treatment with sulfur dioxide gas, amount to about 19 to 20% of the total weight of the catalytic mass. It is to be understood that throughout the specification and claims the quantities of sodium and potassium, and total alkali content are calculated for convenience as sulfates.

While the foregoing sodium-potassium ratio and the total alkali content are preferred, the invention is not necessarily limited thereto. Materially improved results may be obtained where the ratios of sodium to potassium vary from 1 part sodium to 2.5 parts potassium to 1 part sodium to 3.5 parts potassium. It has further been found that although vanadium catalysts having sodium-potassium ratios as noted are preferable, the ratio of sodium to potassium may on the one hand be as high as one to two, and on the other hand as low as one to four. In the preferred embodiment of the invention it will be observed that the total alkali content calculated as sulfate in an unsulfated catalyst is about 19—20%. Although this total alkali content is particularly effective and is to be preferred, such total alkali content by weight of the entire catalytic mass may be as low as 10% and as high as 25%. It will be understood, of course, that while the total alkali content may vary over a considerable range, the above noted ratios are at the same time maintained within their own limits.

The following example illustrates one method of making up catalytic material according to the invention. However, it is to be understood that the invention is not limited to the conditions set forth, since the quantities of ingredients may be varied within rather wide limits without departing from the invention.

Mix dry 136.2 grams of gum tragacanth with 2043 grams of finely divided kieselguhr for several minutes in a suitable mixing device equipped with means for heating the contents thereof. With the mixer kept in operation, add one liter of water. After a few minutes continued mixing add 272.4 grams of potassium sulfate. In a separate suitable container dissolve in one liter of water, 75.6 grams of caustic soda, 81.5 grams of caustic potash and 220 grams of vanadic oxide with the aid of heat and agitation. Add this solution to the mixer while continuing the operation thereof. Use two liters of water to wash out the containers used in handling the constituents of the mix and add the wash water to the batch. Heat the contents of the mixer while in continual operation to almost the boiling point and slowly add 67.8 grams of sulfuric acid diluted to 300 cc. with water. Evaporate the mixture with continuous agitation until the proper consistency and moisture content is reached for granulating, or molding to obtain the material in satisfactory size and shape for use. The shaped product is then preferably roasted to about 600° C. for about an hour, whereby the carbonaceous material is oxidized, and the product becomes more porous by reason of the provision of numerous pores constituting the spaces formerly occupied by the particles of organic matter. The contact mass, preferably after sulfation by treatment with sulfur dioxide gas, is then ready for use.

In the above example, it will be noted that the ratio of sodium to potassium calculated as sulfates is about 134 to 399, or substantially 1 to 3. It will also be found that the total alkalies, likewise calculated as sulfates after roasting in air or in an atmosphere containing no sulfur dioxide gas, are present in quantities amounting to about 20% of the total weight of the catalytic mass.

In making up the above catalytic mix, it is immaterial that the alkalies be added as the compounds stated, but it is preferable that the vanadium be rendered or used in soluble condition, and the alkalies should preferably be in soluble form, not combined with substances adversely influencing the activity of the vanadium compounds.

Although it is preferred in most instances to employ kieselguhr as described, other carriers such as finely ground pumice, precipitated silica, stannic hydroxide, or stannic oxide, or mixtures of all or any of these are also suitable.

When converting sulfur dioxide to sulfur trioxide by means of the catalysts of the invention, it has been found that the temperature range over which commercial conversion may be effected is materially widened, and particularly so in a downward direction. The catalysts of the invention are active at low temperatures, and, when operating with a catalyst of the preferred sodium-potassium ratio as above noted, commercial conversions may be obtained at temperatures of about 750° F., and, at temperatures as low as 725° F., satisfactory initial conversion may be obtained. It will be apparent that a catalyst which is active at these low temperatures presents a two-fold advantage of material commercial importance. When working with a dilute sulfur dioxide gas, such as burner gas, and utilizing a catalyst which is not particularly active at low temperatures, it is usually difficult to maintain the proper inlet temperatures of the reacting gases without constant use of auxiliary heaters, as the temperature generated as the result of the conversion of such gases is not as a rule sufficient to maintain the required temperatures in the system. Thus, it will be seen that when operating with dilute burner gases and catalysts of the present invention, the reacting gas mixture may be introduced into the initial converter at low temperatures, thus avoiding the use of auxiliary heaters just ahead of the first converter. On the other hand, when operating with sulfur dioxide gases of high concentration and utilizing catalysts which are commercially effective only at higher temperatures, the use of high inlet temperatures reduces the conversion obtained since with a strong gas the temperature rise is sufficiently great that the dissociation point of the gas is reached before the usual conversion percentage is obtained. Accordingly, when operating with catalysts of the present invention and sulfur dioxide gases of high concentration, conversion may be initiated at lower temperatures and the maximum conversion percentages obtained before a temperature is reached which is sufficiently high to prevent further conversion.

The catalysts of the present invention are not limited in use to the catalytic conversion of sulfur dioxide-oxygen gas mixtures, but may be employed in catalytic processes in general, for example, the manufacture of phthalic anhydride, anthraquinone, benzaldehyde, benzoic acid, maleic acid, etc.

I claim:

1. A catalyst comprising vanadium in chemical combination distributed on a finely divided carrier and containing sodium and potassium in such quantities that the ratio of sodium to potassium, calculated as sulfates, is not substantially greater than 0.5 and not substantially less than 0.25.

2. A catalyst comprising vanadium in chemical combination distributed on a finely divided carrier and containing sodium and potassium in such quantities that the ratio of sodium to potassium, calculated as sulfates, is not substantially greater than 0.4 and not substantially less than 0.29.

3. A catalyst comprising vanadium in chemical combination distributed on a finely divded carrier and containing sodium and potassium in such quantities that the ratio of sodium to potassium, calculated as sulfates, is approximately 0.33.

4. A catalyst comprising vanadium in chemical combination distributed on a finely divided carrier and containing sodium and potassium in such quantities that the ratio of sodium to potassium, calculated as sulfates, is not substantially greater than 0.5 and not substantially less than 0.25, and that the total alkalies, calculated as sulfates, are present in the unsulfated catalyst in amounts not less than about 10% and not more than about 25% of the total weight.

5. A catalyst comprising vanadium in chemical combination distributed on a finely divided carrier and containing sodium and potassium in such quantities that the ratio of sodium to potassium, calculated as sulfates, is not substantially greater than 0.4 and not substantially less than 0.29, and that the total alkalies, calculated as sulfates, are present in the unsulfated catalyst in amounts not less than about 10% and not more than about 25% of the total weight.

6. A catalyst comprising vanadium in chemical combination distributed on a finely divided carrier and containing sodium and potassium in such quantities that the ratio of sodium to potassium, calculated as sulfates, is not substantially greater than 0.4 and not substantially less than 0.29, and that the total alkalies, calculated as sulfates, present in the unsulfated catalyst amount to about 19—20% of the total weight.

7. A catalyst comprising vanadium in chemical combination distributed on a finely divided carrier and containing sodium and potassium in such quantities that the ratio of sodium to potassium, calculated as sulfates, is approximately 0.33, and that the total alkalies, calculated as sulfates, present in the unsulfated catalyst amount to about 19—20% of the total weight.

8. The method of effecting gas phase catalytic reactions which comprises contacting a gas mixture containing reactant constituents and heated to a reactive temperature with a catalyst comprising vanadium in chemical combination distributed on a finely divided carrier and containing sodium and potassium in such quantities that the ratio of sodium to potassium, calculated as sulfates, is not substantially greater than 0.5 and not substantially less than 0.25.

9. The method of effecting gas phase catalytic reactions which comprises contacting a gas mixture containing reactant constituents and heated to a reactive temperature with a catalyst comprising vanadium in chemical combination distributed on a finely divided carrier and containing sodium and potassium in such quantities that the ratio of sodium to potassium, calculated as sulfates, is approximately 0.33.

10. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is not substantially greater than 0.5 and not substantially less than 0.25.

11. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is not substantially greater than 0.4 and not substantially less than 0.29.

12. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is approximately 0.33.

13. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is not substantially greater than 0.5 and not substantially less than 0.25, and that the total alkalies, calculated as sulfates, are present in the unsulfated catalyst in amounts not substantially less than 10% and not substantially more than about 25% of the total weight.

14. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is not substantially greater than 0.4 and not substantially less than 0.29, and that the total alkalies, calculated as sulfates, are present in the unsulfated catalyst in amounts not substantially less than about 10% and not substantially more than about 25% of the total weight.

15. The process of converting sulfur dioxide to sulfur trioxide which comprises passing a gas mixture containing sulfur dioxide and oxygen heated to a reactive temperature in contact with a catalyst comprising vanadium in chemical combination distributed on a finely divided carrier and containing sodium and potassium in such quantities that the ratio of sodium to potassium, calculated as sulfates, is approximately 0.33, and that the total alkalies, calculated as sulfates, present in the unsulfated catalyst amount to about 19—20% of the total weight.

16. A vanadium catalyst containing sodium and potassium in such quantities that the ratio of sodium to potassium, calculated as sulfates, is not substantially greater than 0.5 and not substantially less than 0.25.

17. A vanadium catalyst containing sodium and potassium in such quantities that the ratio of sodium to potassium, calculated as sulfates, is approximately 0.33.

18. The process of converting sulfur dioxide to sulfur trioxide which comprises passing a gas mixture containing sulfur dioxide and oxygen heated to a reactive temperature in contact with a vanadium catalyst containing sodium and potassium in such quantities that the ratio of sodium to potassium, calculated as sulfates, is not substantially greater than 0.5 and not substantially less than 0.25.

19. The process of converting sulfur dioxide to sulfur trioxide which comprises passing a gas mixture containing sulfur dioxide and oxygen heated to a reactive temperature in contact with a vanadium catalyst containing sodium and potassium in such quantities that the ratio of sodium to potassium, calculated as sulfates, is approximately 0.33.

HENRY JOSEPH.